US012092425B2

(12) United States Patent
Kubitschek

(10) Patent No.: US 12,092,425 B2
(45) Date of Patent: Sep. 17, 2024

(54) DISTANCE MARKER TAPE LIGHT ASSEMBLY

(71) Applicant: Accurate Archery L.L.C., Stacy, MN (US)

(72) Inventor: James Kubitschek, Stacy, MN (US)

(73) Assignee: ACCURATE ARCHERY L.L.C., Stacy, MN (US)

( * ) Notice: Subject to any disclaimer, the term of this patent is extended or adjusted under 35 U.S.C. 154(b) by 37 days.

(21) Appl. No.: 17/730,334

(22) Filed: Apr. 27, 2022

(65) Prior Publication Data

US 2022/0341699 A1 Oct. 27, 2022

Related U.S. Application Data

(60) Provisional application No. 63/180,231, filed on Apr. 27, 2021.

(51) Int. Cl.

*F41B 5/14* (2006.01)
*F41G 1/467* (2006.01)
*F21Y 115/10* (2016.01)

(52) U.S. Cl.

CPC ............ *F41B 5/1403* (2013.01); *F41G 1/467* (2013.01); *F21Y 2115/10* (2016.08)

(58) Field of Classification Search

CPC ........... F41B 5/14; F41B 5/1403; F41G 1/467
See application file for complete search history.

(56) References Cited

U.S. PATENT DOCUMENTS

| | | | | | |
|---|---|---|---|---|---|
| 649,544 | A * | 5/1900 | Morse | F16M 13/02 | 362/296.01 |
| 3,739,167 | A * | 6/1973 | Avery | F21L 14/00 | 362/110 |
| 4,640,258 | A * | 2/1987 | Penney | F41B 5/1426 | 124/24.1 |
| 5,297,533 | A * | 3/1994 | Cook | F41G 1/35 | 124/88 |
| 5,649,525 | A * | 7/1997 | Koepf | F41B 5/066 | 362/253 |
| 6,481,871 | B2 * | 11/2002 | Jamison | F21V 21/30 | 362/427 |
| 6,824,298 | B2 * | 11/2004 | Childs | F21S 8/06 | 362/147 |
| 6,978,775 | B2 * | 12/2005 | Graf | F41B 5/143 | 124/44.5 |
| 8,387,608 | B2 * | 3/2013 | Morris, II | F41B 5/1403 | 124/25.6 |
| 2010/0236536 | A1 * | 9/2010 | Erickson | F41B 5/14 | 124/1 |

* cited by examiner

*Primary Examiner* — John A Ricci
(74) *Attorney, Agent, or Firm* — Fredrikson & Byron, P.A.

(57) ABSTRACT

An assembly includes a mounting bracket that defines one or more mounting bracket holes, one or more fasteners configured to secure the mounting bracket to an archery bow via the one or more mounting bracket holes, and a light source coupled to the mounting bracket and configured to illuminate a distance marker tape of the archery bow. The distance marker tape light assembly can be used to illuminate distance marker tape on a variety of archery bows. The distance marker tape light assembly can be considered a universal distance marker tape light assembly due to the large number of different archery bows on which the distance maker light assembly can be effective.

20 Claims, 6 Drawing Sheets

DISTANCE MARKER TAPE LIGHT ASSEMBLY

TECHNICAL FIELD

This disclosure relates to archery bows and in particular, to archery bow sights.

BACKGROUND

Archery bows can be used in target practice, bow hunting, archery competitions and the like. In many cases, the bow includes sights to help a user aim and hit his/her intended target. While a user can adjust the sight to be very accurate at a specific distance (e.g., 25 yards), it can be challenging to subsequently accurately adjust the sight and/or aim the bow at a target that is located closer (e.g., 10 yards) or further away (e.g., 50 yards) from the distance to which the sight is adjusted. One solution to maintain accuracy over a range of distances is a sight scale, yardage marker tape, or distance marker tape. A distance marker tape can ensure consistency when adjusting the sight for distance by providing markings on the sight's adjustment mechanism which correspond to the range of distances. Distance marker tapes come with different spacing between markings to enable a user to select a distance marker tape that matches their specific bow configuration. For example, bow manufacturers can create different bows that require different distance marker tapes due to their individual construction. While a distance marker tape is helpful, in some situations, the distance marker tape becomes difficult or impossible to read.

SUMMARY

Some aspects include an assembly. The assembly can include a mounting bracket defining one or more mounting bracket holes. The assembly can further include one or more fasteners configured to secure the mounting bracket to an archery bow via the one or more mounting bracket holes. The assembly can also include a light source coupled to the mounting bracket and configured to illuminate a distance marker tape of the archery bow.

In some embodiments, an assembly for illuminating a distance marker tape of an archery bow includes an elongated piece defining one or more mounting bracket holes, with the elongated piece having a lower portion and an upper portion. The lower portion can be angled relative to the upper portion. The assembly can also include a light supporting piece defining a lighting mounting hole with the light supporting piece coupled to the upper portion of the elongated piece.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

Figure 1C:
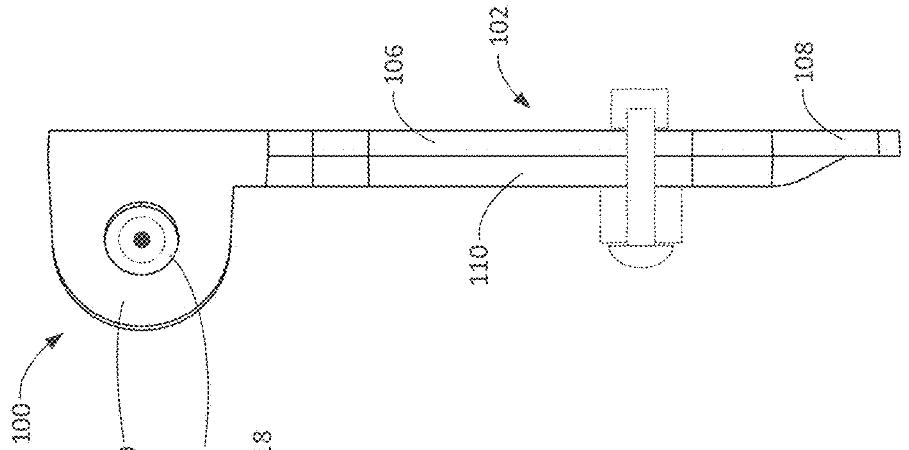
FIG. 1C is an orthogonal front view of a mounting bracket of a distance marker tape light assembly according to an aspect of the present disclosure.
Figure 1B:
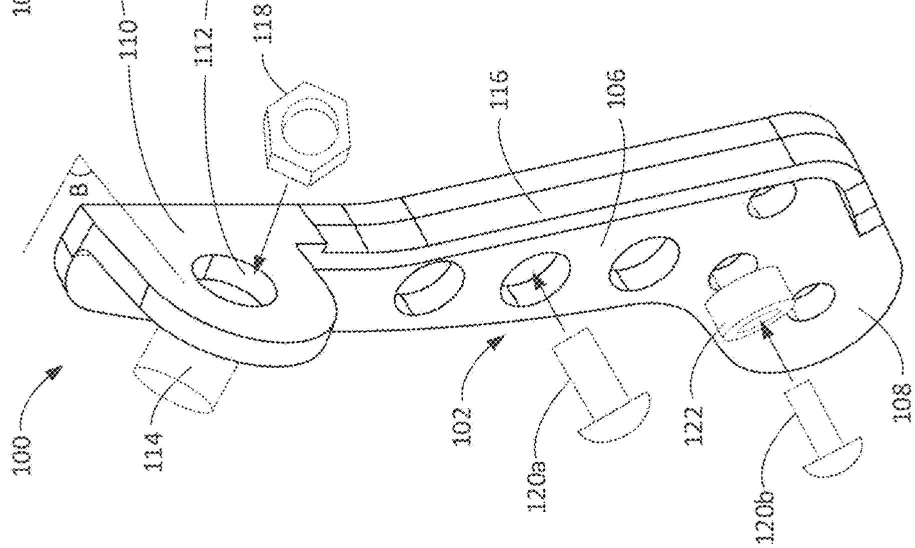
FIG. 1B is a perspective view of a mounting bracket of a distance marker tape light assembly according to an aspect of the present disclosure.
Figure 1A:
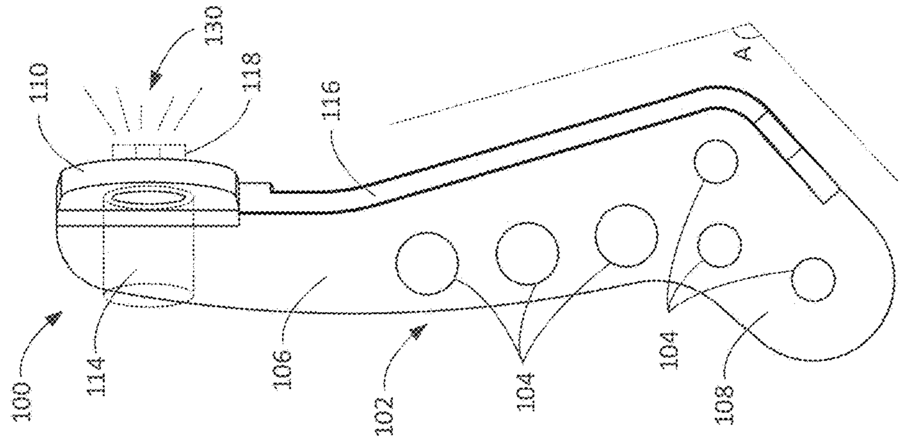
FIG. 1A is an orthogonal side view of a mounting bracket of a distance marker tape light assembly according to an aspect of the present disclosure.

FIGS. 1A-1C illustrate different views of a mounting bracket 100 for a distance marker tape light assembly. The mounting bracket includes a planar portion 102 that defines one or more mounting bracket holes 104. The planar portion 102 includes an upper elongated portion 106 and a lower lobe 108 which can be at an angle relative to each other. The mounting bracket 100 further includes a light support portion 110 that defines a lighting mounting hole 112 with the light support portion 110 coupled to the upper elongated portion 106 of the planar portion 102. The light support portion 110 can support a light source 114, which can, in some examples, pass partially through the lighting mounting hole 112 for support.

The main part of the mounting bracket is the planar portion 102. The planar portion 102 does not have to be exactly planar but is generally planar as illustrated in FIG. 1C. The planar portion 102 can also take many different shapes, however the planar portion of FIG. 1A is in the general shape of an "L". The upper elongated portion 106 of the planar portion 102 comprises the upper part of the "L" while the lower lobe 108 of the planar portion 102 comprises the lower part of the "L".

As illustrated in FIG. 1A, the upper elongated portion 106 and the lower lobe 108 are at an angle relative to each other with the angle represented by "A". The angle between the upper elongated portion 106 and the lower lobe 108 can be any angle, however, in some embodiments, the angle "A" is between 90 degrees and 180 degrees. In some embodiments, the angle "A" may be adjustable, as the mounting bracket may be made of multiple pieces. The angled configuration of the upper elongated portion 106 relative to the lower lobe 108 can provide advantages when mounting to an archery bow as is described elsewhere herein.

Continuing with the planar portion 102, the planar portion 102 defines a series of mounting bracket holes 104. The mounting bracket holes 104 are configured to accept fasteners such as 120*a* and 120*b*, which can attach the mounting bracket 100 to an archery bow. In FIG. 1A, the planar portion defines a series of six mounting bracket holes 104. However, the number of holes can range from as few as one mounting bracket hole to ten or more. In some embodiments, the number of mounting bracket holes is fewer than eight holes as having more holes may compromise the strength of the mounting bracket. The number of mounting bracket holes can increase the number of unique bows to which the mounting bracket can attach.

The series of mounting bracket holes can have different sizes. For instance, in the embodiment illustrated in FIGS. 1A-1C, there are two different sizes of mounting bracket holes 104 with the three mounting bracket holes located on the upper elongated portion 106 being larger than the three mounting bracket holes located on the lower lobe 108. The two differently sized mounting bracket holes can accept two different sizes of fasteners; the larger mounting bracket holes can accept larger fasteners such as 120*a* while the smaller mounting bracket holes can accept smaller fasteners such as 120*b*. By using different size holes, the mounting bracket enables the use of different fasteners on different portions of the mounting bracket 100. In some examples, three or more different sizes of fasteners can be used along with three or more different sizes of mounting bracket holes. The ability to use differently sized fasteners for mounting the mounting bracket to an archery bow can increase the number of unique bows to which the mounting bracket can attach. Additionally, in some examples, one or more spacers 122 may be used in combination with a fastener (e.g., 120*a/b*). The spacer 122 can be useful when attaching the mounting bracket 100 to an archery bow as it can expand the range of fasteners that can be used with the mounting bracket (e.g., longer fasteners).

Further, the series of mounting bracket holes 104 can be located anywhere on the planar portion 102 of the mounting bracket 100. For instance, in the embodiment illustrated in FIGS. 1A-1C, the mounting bracket holes 104 generally follow a line in the shape of the mounting bracket 100, with one exception being what is shown as the rightmost mounting bracket hole. Also, while some mounting bracket holes 104 are located in the upper elongated portion 106 of the mounting bracket 100, some mounting bracket holes 104 are located in the lower lobe 108 of the mounting bracket 100. Additionally, the mounting bracket holes 104 have different spacing between them, with some being closer to their closest mounting bracket hole and others being further away from their closest mounting bracket hole. The various positions of the mounting bracket holes 104 can increase the number of unique bows to which the mounting bracket can attach.

As described above, the number, size, and positioning of the mounting bracket holes 104 can increase the number of unique bows to which the mounting bracket 100 can attach. By having a large number of the mounting bracket holes and by having them in specific positions with appropriate sizing, the mounting bracket of FIG. 1A-1C can be attached to a plethora of different archery bows. In some examples, because of the number, size, and positioning of the mounting bracket holes, the mounting bracket 100 can be considered a universal mounting bracket for archery bows. In some examples, a universal mounting bracket can mean fitting the vast majority of commercially produced archery bows.

Continuing with FIGS. 1A-1C, the mounting bracket 100 also includes a strengthening rib 116. The strengthening rib 116 can increase the structural rigidity of the mounting bracket 100 and can prevent the mounting bracket 100 from twisting along its long side. The strengthening rib 116 runs along, or follows, the edge of the planar portion 102 from the lower lobe 108 up through the upper elongated portion 106 and contacting the light support portion 110. In some embodiments, the strengthening rib runs along an entire side of the edge of the planar portion. For instance, the strengthening rib can run from the lighting support down either the left or right edge (left and right defined with respect to FIG. 1A) to the very bottom of the lower lobe. However, in some embodiments, the strengthening rib runs along only a portion of the left or right edge of the planar portion. In the embodiment of FIGS. 1A-1C, the strengthening rib gradually tapers to be flush with the planar portion 102 at the lower lobe 108. In some examples, the strengthening rib does not gradually taper, while in some examples, the strengthening rib tapers at both ends. The strengthening rib 116 can be made of the same material as the rest of the mounting bracket 100 but is thicker than the planar portion 102. The strengthening rib 116 generally includes extra material to enable it to provide more strength than the planar portion 102 can provide alone.

The mounting bracket 100 can be made of any material (e.g., aluminum, plastics, etc.), but in some examples, the mounting bracket is made from a glass-filled nylon material. Using a glass-filled nylon material can be advantageous as it is lightweight and strong compared to other materials and can be simpler to manufacture. The mounting bracket can, in some embodiments, be made from multiple materials that can be welded or otherwise secured to each other to form the mounting bracket.

Further in FIGS. 1A-1C, the mounting bracket 100 includes a light support portion 110, which defines a lighting mounting hole 112. The light support portion 110 can be integrally formed with the mounting bracket 100 as it is in the illustrated embodiment, however, in some embodiments, the light support portion is separately coupled to the mounting bracket. The light support portion 110 is bent relative to the mounting bracket 100 at an angle "B". The light support portion can be coupled to form the angle "B" or can be integrally formed to form the angle "B". The angle "B" can have any value, but in some examples is between 45 degrees and 135 degrees. In some embodiments, the angle "B" is approximately 90 degrees. The angle "B" at which the light support portion 110 is angled relative to the mounting bracket can determine in what direction the light source 114 shines. It can be advantageous to have an angle "B" that is approximately 90 degrees, or slightly over 90 degrees, as on most archery bows, the distance marker tape is slightly inward relative to where the mounting bracket 100 attaches to the archery bow. The light source 114 is illustrated with illumination lines 130 to show the general direction the light source 114 shines. In some embodiments, the angle "B" may be adjustable, as the mounting bracket may be made of multiple pieces.

The light support portion 110 along with the lighting mounting hole 112 can enable a light source 114 to secure to the mounting bracket 100. For instance, in the illustrated embodiment, a portion of the light source 114 can pass through the lighting mounting hole 112. In some embodiments, the portion of the light source 114 which passes through the lighting mounting hole 112 can be secured to the mounting bracket 100 via a nut 118, thereby securing the entire light source 114 to the mounting bracket 100. In some such embodiments, at least a portion of the light source is threaded to threadibly engage the nut 118 and prevent the light source 114 from disengaging the mounting bracket 100. Additionally or alternatively, in some embodiments, the lighting mounting hole is threaded. In some such embodiments, the light source 114 can threadibly engage with the lighting mounting hole 112 which can secure the light source 114 to the mounting bracket with or without the nut 118. A person having ordinary skill in the art will appreciate that other methods of mounting the light source to the mounting bracket via the lighting mounting hole are contemplated and that this disclosure is not limited to the examples provided above. In some embodiments, the light source may be integral with the mounting bracket.

The light source 114 can be any type of light source, but in some embodiments is a light emitting diode (LED) light source. In the illustrated embodiment of FIG. 1A, illumination lines 130 show the general direction the light source 114 shines. The light source 114 can include an integral power source such as a battery and can, in some embodiments, have a mechanism whereby twisting the light source can power on/shut off the light source. As described elsewhere herein, the light source 114 can include a threaded portion, which can be used to secure the light source 114 to the mounting bracket via the light support portion 110 and the lighting mounting hole 112.

Figure 2B:
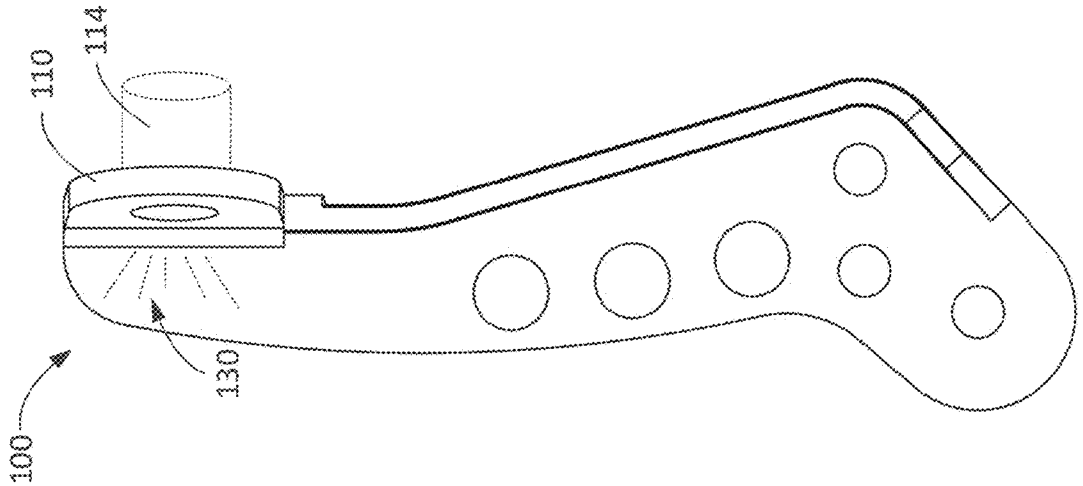
FIG. 2B is an orthogonal side view of the mounting bracket of FIG. 1A with a second light configuration according to an aspect of the present disclosure.
Figure 2A:
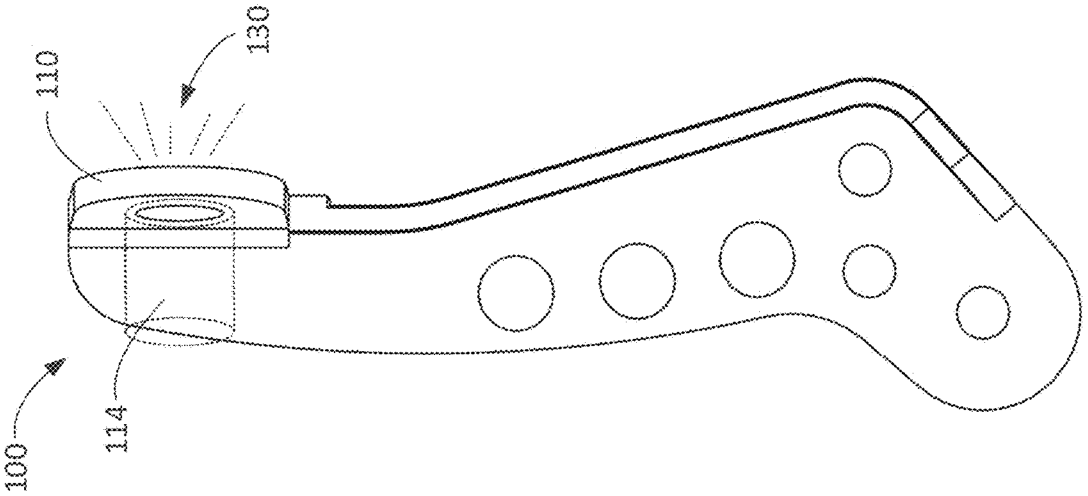
FIG. 2A is an orthogonal side view of the mounting bracket of FIG. 1A with a first light configuration according to an aspect of the present disclosure.

Moving to FIGS. 2A-2B illustrate orthogonal side views of the mounting bracket of FIGS. 1A-1C with different light source configurations. Specifically, FIG. 2A illustrates a mounting bracket 100 with a light source 114 mounted on the left side of the light support portion 110, thereby providing illumination facing rightward as illustrated by the illumination lines 130. In contrast, FIG. 2B illustrates a mounting bracket 100 with a light source 114 mounting on the right side of the light support portion 110, thereby providing illumination facing leftward as illustrated by the illumination lines 130. In some embodiments, the light source 114 can be removably attached to the mounting bracket 100 on either side of the light support portion 110. As a person of ordinary skill will appreciate, the ability to move the light source to either side of the light support portion can enable the light source to illuminate the distance marker tape on different types of archery bows, as well as on different sides of archery bows. Thus, the configuration of the mounting bracket and light source can increase the "universality" of the distance marker tape light assembly.

Figure 3:
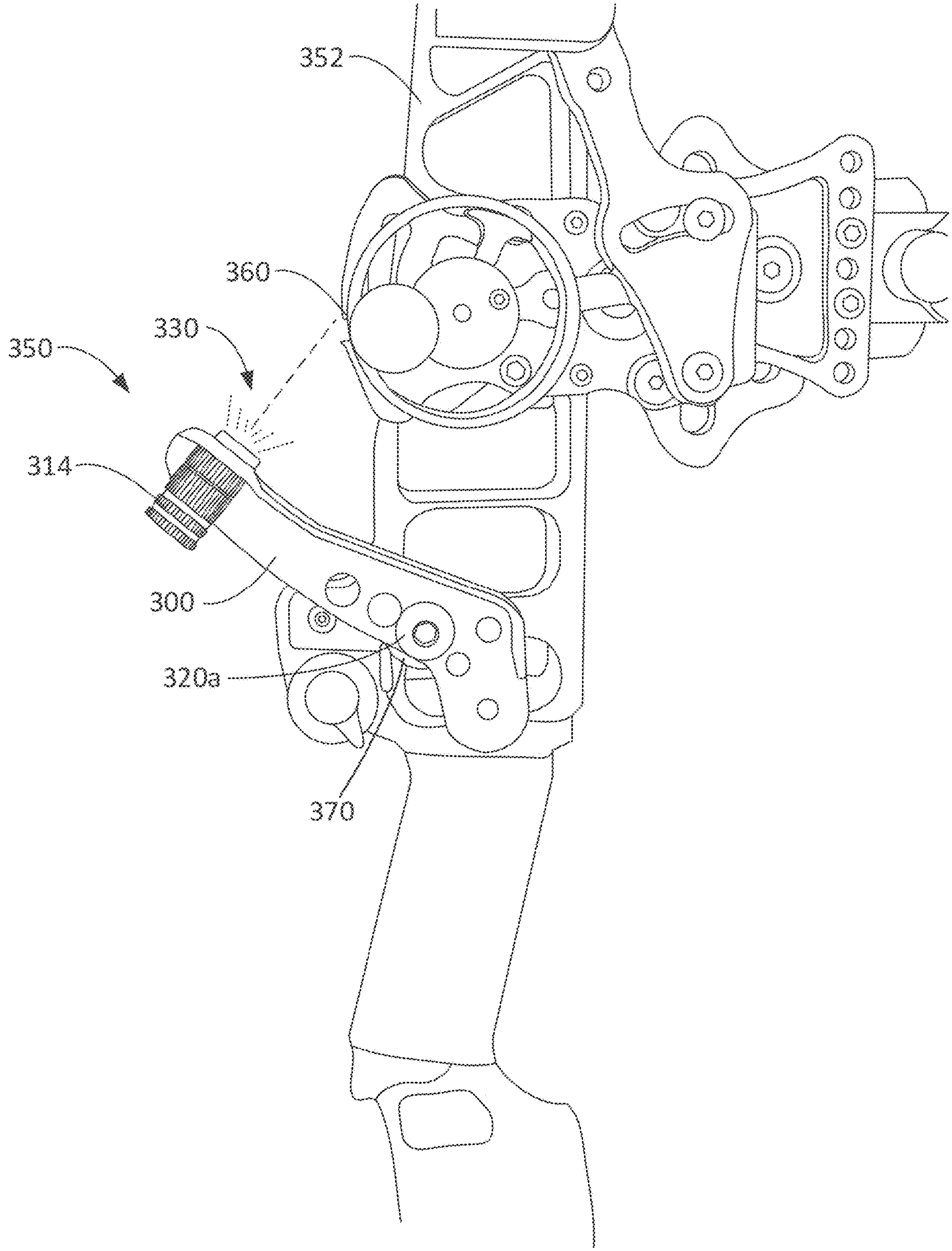
FIG. 3 is a perspective side view of a distance marker tape light assembly affixed to a first type of archery bow in a first configuration according to an aspect of the present disclosure.

Moving to FIG. 3, FIG. 3 is a perspective side view of a distance marker tape light assembly 350 affixed to a first type of archery bow 352 in a first configuration. The distance marker tape light assembly 350 includes a mounting bracket 300 attached to the archery bow 352 via a fastener 320*a* that goes through a mounting bracket hole. In the illustrated example, the distance marker tape light assembly 350 is secured to an accessory mount 370 of the archery bow 352. However, in some embodiments, the distance marker tape light assembly is secured to an arrow rest of the archery bow 352. In the illustrated embodiment, the distance marker tape light assembly 350 is mounted on a right side of the archery bow 352.

The distance marker tape light assembly 350 further includes a light source 314 that illuminates the distance marker tape 360 as illustrated by the illumination lines 330. As can be seen in FIG. 3, the light source 314 is aligned with the distance marker tape 360. The mounting bracket 300 can be rotated relative to the archery bow about the fastener 320*a* to direct the light source at the distance marker tape of the archery bow. A user can rotate the mounting bracket 300 relative to the archery bow 352 before or after mounting bracket 300 is secured to the archery bow 352. In some examples, the distance marker tape light assembly can include a spacer (e.g., 122 of FIG. 1) to better align the light source with the distance marker tape. In many embodiments, the distance marker tape light assembly 350 can be secured to the archery bow by two or more fasteners through corresponding mounting bracket holes.

Figure 4:
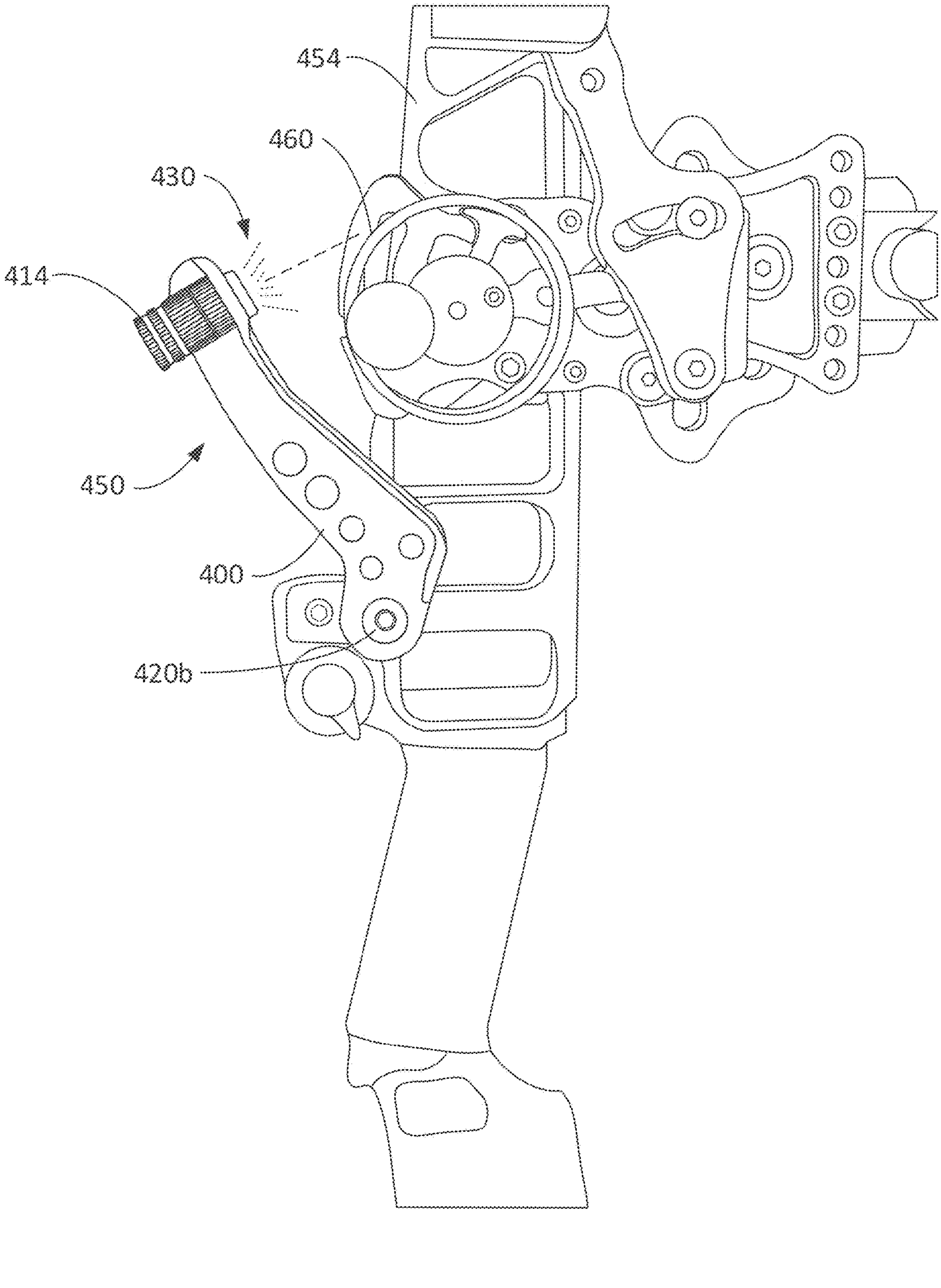
FIG. 4 is a perspective side view of a distance marker tape light assembly affixed to a second type of archery bow in a first configuration according to an aspect of the present disclosure.

Moving to FIG. 4, FIG. 4 is a perspective side view of a distance marker tape light assembly 450 affixed to a second type of archery bow 454 in a first configuration. The distance marker tape light assembly 450 includes a mounting bracket 400 attached to the archery bow 454 via a fastener 420*b* that goes through a mounting bracket hole. In comparison to the embodiment of FIG. 3, the fastener 420*b* is smaller and passes through a different mounting bracket hole. In the illustrated example, the distance marker tape light assembly 450 is secured to an accessory mount of the archery bow 454 and is mounted on the right side of the archery bow 454.

In similarity with the embodiment of FIG. 3, the distance marker tape light assembly 450 of FIG. 4 can be rotated relative to the archery bow 454 about the fastener 420*b*. However, because the fastener 420*a* is secured through a different mounting hole than the fastener in FIG. 3, the distance marker tape light assembly 450 rotates differently and enables the light source 414 to be directed in a different direction than in FIG. 3. For example, the use of a different mounting hole enables the height of the light source 414 to be adjusted relative to the distance marker tape 460. Such a configuration allows a user to adjust the distance marker tape light assembly 450 to illuminate the distance marker tape for his/her specific bow configuration.

Figure 5:
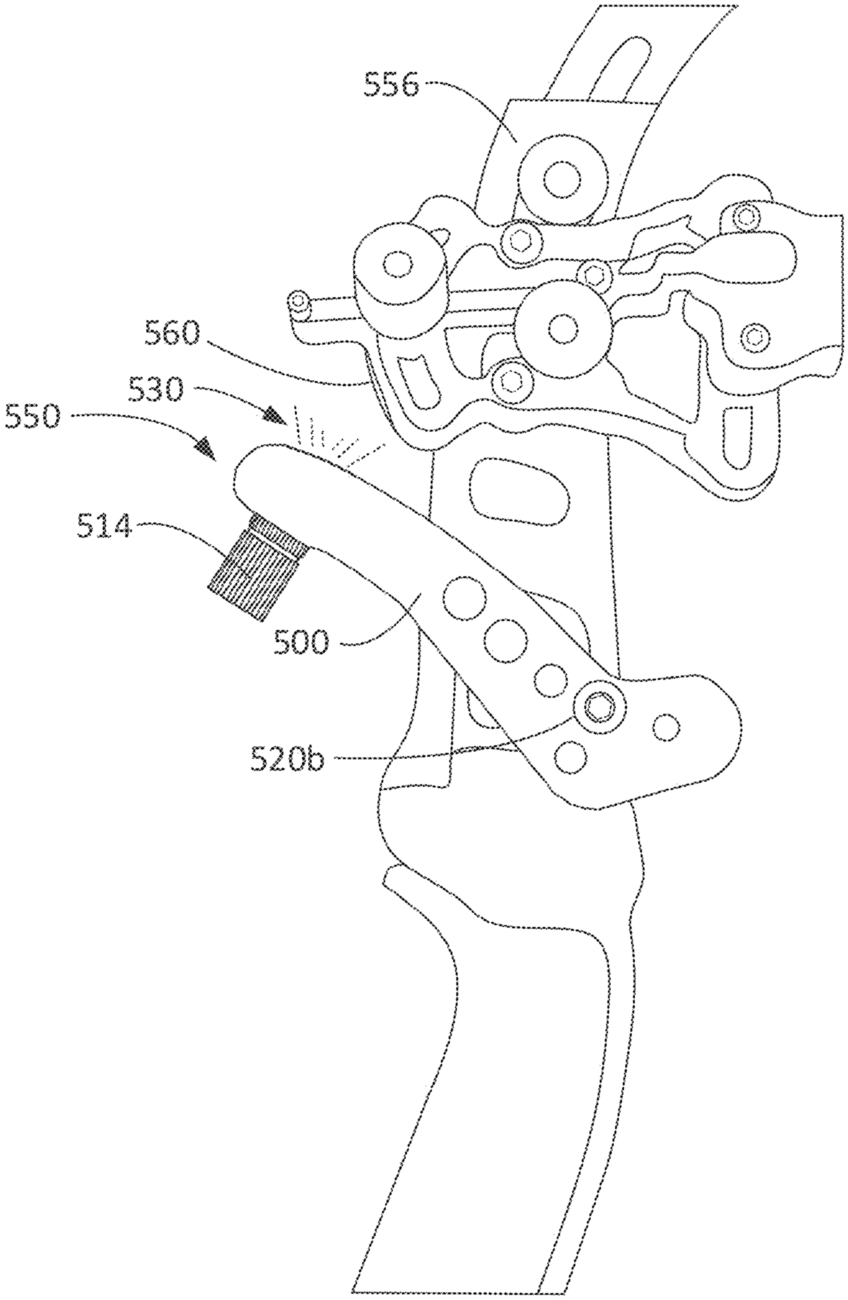
FIG. 5 is a perspective side view of a distance marker tape light assembly affixed to a third type of archery bow in a first configuration according to an aspect of the present disclosure.

Moving to FIG. 5, FIG. 5 is a perspective side view of a distance marker tape light assembly 550 affixed to a third type of archery bow 556 in a first configuration. The distance marker tape light assembly 550 includes a mounting bracket 500 attached to the archery bow 556 via fastener 520*b*. The fastener 520*b* used in the embodiment of FIG. 5 can be the same size as the fastener used in the embodiment of FIG. 4. In comparison to the embodiments of FIG. 3 and FIG. 4, the distance marker tape light assembly 550 is affixed to the archery bow 556 in a reverse position wherein the mounting bracket has a lower portion face to the right instead of to the left. In the illustrated position, the strengthening rib of the mounting bracket is not visible as it is only on one side of the mounting bracket. In some examples, though, the strengthening rib is on the other side or alternatively, on both sides of the mounting bracket.

In similarity with the embodiments of FIG. 3 and FIG. 4, the distance marker tape light assembly 550 of FIG. 5 can be rotated relative to the archery bow 556 about the fastener 520*b*. However, because the fastener 520*b* is secured to the archery bow 556 through a different mounting hole than either FIG. 3 or FIG. 4, the distance marker tape light assembly 550 can rotate differently. In the illustrated example, the light source 514 is directed toward the distance marker tape 560 as evidenced by the illumination lines 530. The positioning of the light source 514 to properly illuminate the distance marker tape 560 is due to the side of the distance marker tape light assembly 550 attached to the archery bow 556 (e.g., backwards facing "L" or forward facing "L"), the position (e.g., which hole the distance marker tape light assembly 550 is attached to the archery bow 556 through), and the rotation of the distance marker tape light assembly 550.

Figure 6:
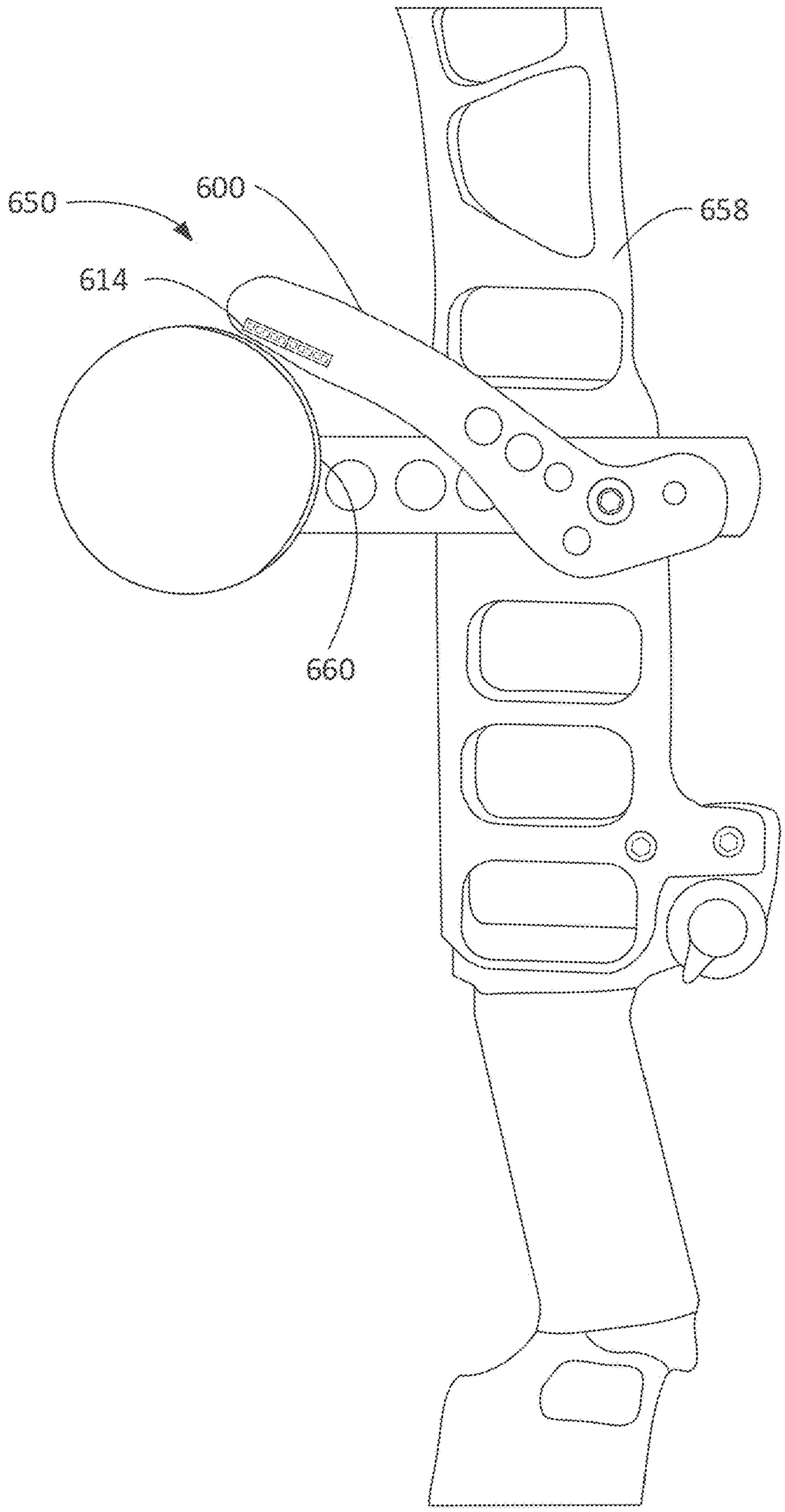
FIG. 6 is a perspective side view of an alternative embodiment of a distance marker tape light assembly affixed to a fourth type of archery bow in a first configuration according to an aspect of the present disclosure.

Moving to FIG. 6, FIG. 6 is a perspective side view of an alternative embodiment of a distance marker tape light assembly affixed to a fourth type of archery bow in a first configuration. The distance marker tape light assembly 650 is coupled to the archery bow 658 in a similar manner as described in FIGS. 3-5, however, the distance marker tape light assembly 650 is coupled on a left side instead of a right side of the archery bow 658. Being able to secure the distance marker tape light assembly 650 to either side of the archery bow can be beneficial as archery sights, which determine the position of the distance marker tape, can be located on either side of the bow. The distance marker tape light assembly 650 of the illustrated embodiment also contrasts with the distance marker tape light assembly embodiments of FIGS. 3-5 as the light source 614 is placed and secured to the mounting bracket 600 differently. Instead of illuminating the distance marker tape 660 directly via its front, the light source 614 illuminates the distance marker tape 660 from the side. In some examples, the light source 614 comprises a strip of LED lights to illuminate the distance marker tape 660 from the side. One advantage of using the light source 614 that illuminates the distance marker tape 660 from the side is that a light support portion is not required to help support the light. While a direct light source and a side light source are described, a person having ordinary skill will appreciate that this disclosure encompasses other lighting arrangements which attach to the mounting bracket to illuminate distance marker tape for an archery bow. For example, one or more light sources may be built into the distance marker assembly. In such examples, the light source(s) may be positioned along the edge of the distance marker tape and may illuminate the distance marker tape from the side, in a similar manner as is shown in FIG. 6.

As illustrated by the embodiments of FIG. 3-6, users can modify the distance marker tape light assembly to illuminate distance marker tape in a location specific to their archery bow. For example, a user can vary which side of the archery bow the distance marker tape light assembly is attached to (e.g., left or right). A user can also vary which direction the distance marker tape light assembly faces (e.g., backwards facing "L" or forward facing "L"). A user can further vary which mounting hole the distance marker tape light assembly is attached to the archery bow through and if they use a spacer. A user can additionally vary the rotation of the distance marker tape light assembly. Users can also vary, or choose, a specific fastener and a specific spacer that fits their archery bow (e.g., smaller/lager fastener, thin/thick spacer). Moreover, a user can affix the distance marker tape light assembly to a specific portion of his/her bow (e.g., arrow rest, accessory mount). By varying all these different properties, the distance marker tape light assembly can be configured to illuminate the distance marker tape used on nearly every archery bow. In some embodiments, due to the large number of archery bows the distance marker tape light assembly can be effective on, the distance marker tape light assembly can be considered a universal distance marker tape light assembly.

In some embodiments, a distance marker tape light assembly can include a kit of materials that includes at least a mounting bracket, a light source, and one fastener. However, the kit can also include a power source for the light source, equipment (e.g., a hex nut, a hex wrench) for attaching the light source to the lighting support portion, a variety of various sizes of fasteners and spacers, and one or more tools to help secure a fastener through the mounting bracket and to the archery bow.

Various examples have been described. These and other examples are within the scope of the following numbered embodiments.

The invention claimed is:

1. An assembly comprising:
- an archery bow;
- a mounting bracket that defines one or more mounting bracket holes;
- one or more fasteners securing the mounting bracket to the archery bow via the one or more mounting bracket holes; and
- a battery-operated light source coupled to the mounting bracket and configured to illuminate a distance marker tape of the archery bow.

2. The assembly of claim 1, wherein the mounting bracket further comprises:
- a planar portion that defines the one or more mounting bracket holes, the planar portion having a lower lobe and an upper elongated portion, the lower lobe being angled relative to the upper elongated portion; and
- a light support portion that defines a lighting mounting hole, the light source being coupled to the mounting bracket via the lighting mounting hole, the light support portion coupled to the upper elongated portion of the planar portion.

3. The assembly of claim 2, wherein the light support portion is coupled to the planar portion at an angle.

4. The assembly of claim 2, wherein the light source is configured to threadibly engage the light support portion through the lighting mounting hole.

5. The assembly of claim 4, wherein the light source is configured to threadibly engage a front or a back of the light support portion selectively through the lighting mounting hole.

6. The assembly of claim 2, wherein the mounting bracket further comprises a strengthening rib located on an edge of the planar portion.

7. The assembly of claim 6, wherein the strengthening rib is located on a front edge of the planar portion including the lower lobe and the upper elongated portion.

8. The assembly of claim 1, wherein the mounting bracket is rotatable relative to the archery bow about the one or more fasteners to aim the light source at the distance marker tape of the archery bow.

9. The assembly of claim 1, wherein the light source is an LED light.

10. The assembly of claim 1, further comprising one or more spacers configured to accept the one or more fasteners for fastening the mounting bracket to the archery bow.

11. The assembly of claim 1, wherein the mounting bracket is secured to an arrow rest of the archery bow.

12. The assembly of claim 1, wherein the light source is configured to illuminate the distance marker tape on the archery bow from a direction to the side of the distance marker tape.

13. The assembly of claim 1, wherein the one or more mounting bracket holes comprise a series of mounting bracket holes, the series of mounting bracket holes configured to enable the mounting bracket to be a universal mounting bracket for archery bows.

14. The assembly of claim 1, wherein:
- the one or more mounting bracket holes comprise six mounting bracket holes;
- the one or more fasteners comprise three different fasteners each having a different size; and
- one of the three different fasteners is configured to secure the mounting bracket to the archery bow via one of the six mounting bracket holes.

15. The assembly of claim 1, wherein the one or more fasteners are configured to secure the mounting bracket to either a right side or a left side of the archery bow via the one or more mounting bracket holes.

16. An assembly comprising:

a mounting bracket that defines one or more mounting bracket holes, the mounting bracket comprising:

a planar portion that defines the one or more mounting bracket holes, the planar portion having a lower lobe and an upper elongated portion, the lower lobe being angled relative to the upper elongated portion, and a light support portion that defines a lighting mounting hole, the light support portion coupled to the upper elongated portion of the planar portion;

one or more fasteners configured to secure the mounting bracket to an archery bow via the one or more mounting bracket holes; and a light source coupled to the mounting bracket via the lighting mounting hole and configured to illuminate a distance marker tape of the archery bow.

17. The assembly of claim 16, wherein the light source is configured to threadibly engage a front or a back of the light support portion selectively through the lighting mounting hole.

18. The assembly of claim 16, wherein the mounting bracket further comprises a strengthening rib located on an edge of the planar portion.

19. The assembly of claim 18, wherein the strengthening rib is located on a front edge of the planar portion including the lower lobe and the upper elongated portion.

20. An assembly comprising:

a mounting bracket that defines one or more mounting bracket holes, the one or more mounting bracket holes comprising six mounting bracket holes;

one or more fasteners configured to secure the mounting bracket to an archery bow via the one or more mounting bracket holes, the one or more fasteners comprising three different fasteners each having a different size, wherein one of the three different fasteners is configured to secure the mounting bracket to the archery bow via one of the six mounting bracket holes; and a light source coupled to the mounting bracket and configured to illuminate a distance marker tape of the archery bow.

* * * * *